Nov. 30, 1948.  S. VORECH  2,455,030
FLUID PRESSURE CONTROL MECHANISM
Filed Dec. 9, 1944  2 Sheets-Sheet 1
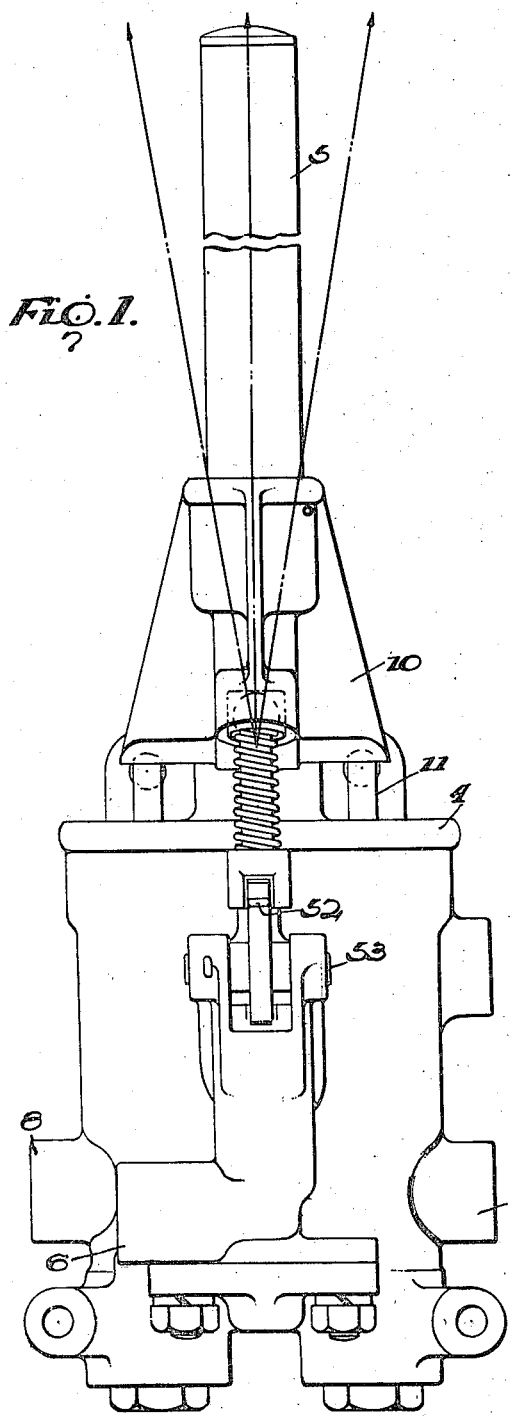
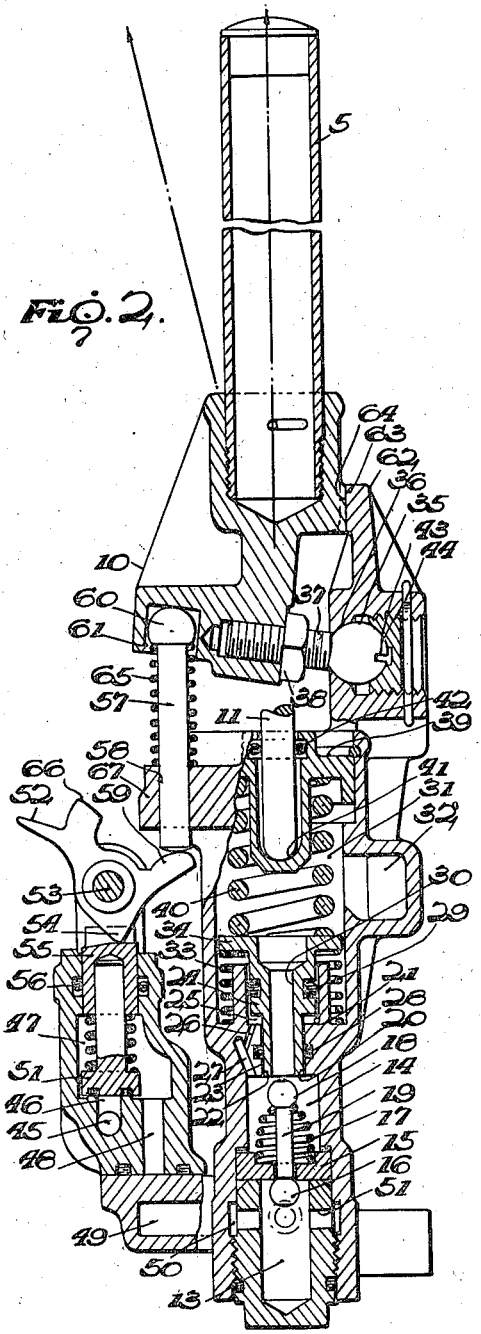
INVENTOR.
Stephen Voreck
BY
Scrivener + Parker
ATTORNEYS Nov. 30, 1948.  S. VORECH  2,455,030
FLUID PRESSURE CONTROL MECHANISM
Filed Dec. 9, 1944  2 Sheets-Sheet 2
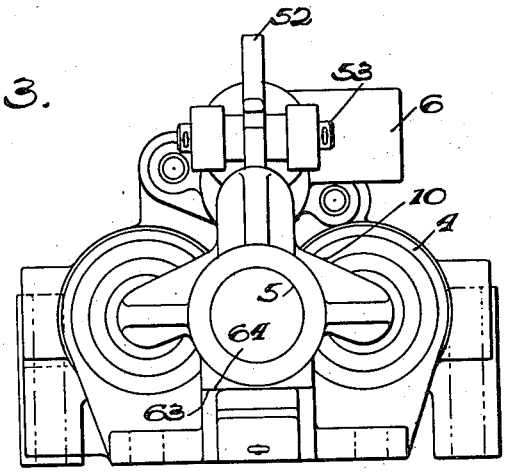
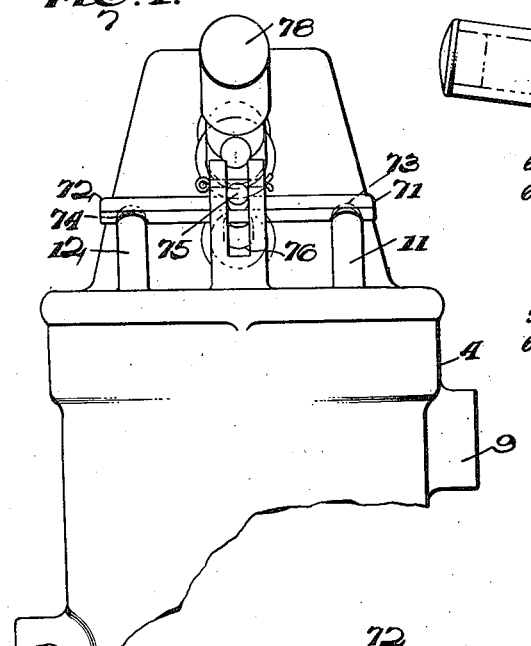
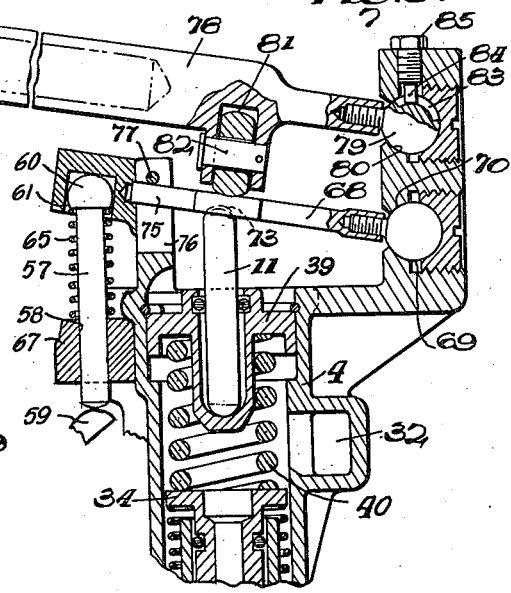
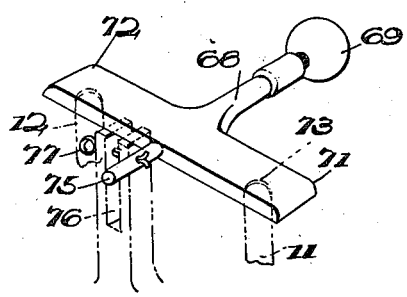
INVENTOR.
Stephen Voreck
BY
Scrivener + Parker
ATTORNEYS Patented Nov. 30, 1948

2,455,030

UNITED STATES PATENT OFFICE 2,455,030

FLUID PRESSURE CONTROL MECHANISM

Stephen Vorech, Elyria, Ohio, assignor to Bendix-Westinghouse Automotive Air Brake Company, Elyria, Ohio, a corporation of Delaware Application December 9, 1944, Serial No. 567,419

11 Claims. (Cl. 303—52)

This invention relates to fluid pressure control mechanism, and more particularly to control valve mechanism for controlling the operation of the brakes on an airplane or other vehicle.

It has previously been proposed to use fluid pressure brakes on airplanes, and more particularly fluid pressure brakes of the compressed air type, and in view of the necessity for reducing the weight of this equipment as much as possible, it has been customary to use a relatively small supply reservoir. This has made it desirable to provide control valve mechanism so constituted as to reduce leakage of the operating fluid to a minimum, and it is accordingly an object of the present invention to provide control valve mechanism for a system of the above type so constructed as to substantially eliminate the possibility of leakage of the brake operating fluid from the supply reservoir when the brake valve is in release position.

A further object of the invention is to provide, in connection with a system of the above type, means for normally isolating the supply reservoir from the main portion of the brake valve mechanism, except when the latter is operated to apply the brakes.

Yet another object of the invention is to provide auxiliary valve means for normally preventing communication between the supply reservoir and the main brake valve, together with means for automatically opening said valve on initial operation on the brake valve controlling element.

A further object of the invention is to provide a brake valve of the duplex type, so constructed as to permit selective operation and control of the brakes on either side of the airplane or other vehicle for the purpose of assisting the steering of the vehicle, this selective operation being under the control of a single control element.

Another object of the invention is to provide means for adjustably positioning the brake valve control element with respect to the main portion of the brake valve.

Still another object of the invention is to provide, in connection with control valve mechanism of the above type having an auxiliary valve for normally isolating the control valve mechanism from the supply reservoir, means for visually indicating to the operator the operation of the auxiliary valve to establish communication between the reservoir and the main control valve mechanism.

Yet another object of the invention is to provide, in connection with a selectively operable duplex brake valve mechanism of the above type, novel operating means associated with the operators control element for effecting such selective operation.

Other objects and novel features of the invention will appear more fully hereinafter from the following detailed description when taken in connection with the drawings illustrating two embodiments of the invention. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 shows a front elevation of the control valve mechanism;

Fig. 2 illustrates a side elevation, partially in section, of the valve mechanism shown in Fig. 1;

Fig. 3 is a view of the mechanism shown in Fig. 1 taken from the top;

Fig. 4 is a fragmentary view of a modified operating mechanism for a valve of the type shown in Fig. 1, certain parts being omitted for purposes of clarity of illustration;

Fig. 5 is a fragmentary side elevation, partially in section, of the mechanism shown in Fig. 4, and including the auxiliary inlet valve, and Fig. 6 illustrates in more detail a portion of the mechanism shown generally in Figs. 4 and 5.

Referring more particularly to Fig. 1, a control valve mechanism of the duplex type is shown as having a casing 4, an operator's control element 5 mounted thereon in the manner hereinafter to be described, the casing being provided with an inlet connection 6, right and left outlet connections 7 and 8, and a common exhaust connection 9. The operator's control element is provided with an enlarged portion at its lower end, and this portion is adapted to engage right and left valve operating plungers 11 and 12 respectively, and as will be more fully explained hereinafter, operation of the element 5 and the portion 10 is adapted to effect separate or concurrent operation of the plungers 11 and 12.

As shown, the casing is of the duplex type adapted to contain right and left control valve mechanisms controlled by the plungers 11 and 12, and referring now to Fig. 2 of the drawings, illustrating the right hand valve mechanism in section, it will be noted that the casing is provided with an inlet chamber 13, an outlet chamber 14, and a ported partition 15 for permitting communication between the chambers, communication between the chambers being normally prevented by means of an inlet valve 16 normally maintained in port closing position by means of an inlet valve spring 17 interposed between the upper surface of the partition and the lower side of the exhaust valve 18 connected with the inlet valve by means of a stem 19. A bore 20 is provided in the casing at the upper end of the outlet chamber, and an enlarged bore 21 is formed in the casing above the first named bore concentrically therewith, a valve operating element 22 being slidably mounted in the bores, having a portion 23 adapted to slide in the smaller of the two bores and a portion 24 adapted to slide in the larger bore. The enlarged portion 24 of the element forms, in connection with an enlarged bore 21 in the casing, a control chamber 25 connected with the outlet chamber by means of restricted passages 26 and 27. A seal 28 is provided in the bore 20 for preventing leakage of fluid pressure past the valve element portion 23, a similar seal 29 being carried by the enlarged portion of the valve operating element in order to prevent leakage from the control chamber 25. The valve operating element is provided with a centrally located bore 30 communicating at its lower end with an outlet chamber 14 and at its upper end with an exhaust chamber 31 formed in the casing and connected with atmosphere by means of an exhaust passage 32, the latter passage in turn being connected with the exhaust connection 9, heretofore described. The valve operating element is normally maintained in the position shown by means of a spring 33 interposed between the casing and a flange formed on the element, and it will accordingly be understood that with the parts in the position shown, the inlet valve serves to prevent communication between the inlet chamber and the outlet chamber, while communication is permitted between the outlet chamber and atmosphere through the bore 30, the exhaust chamber 31, the exhaust passage 32 and the connection 9. On downward movement of the element, the lower end of the bore engages the exhaust valve 18 in order to prevent communication between the outlet chamber and atmosphere, further movement of the element serving to open the inlet valve in order to permit communication between the inlet and outlet chamber, it being understood that the outlet chamber 14 is connected with the outlet connection 7, the latter being connected in any suitable manner with the brake actuator, not shown. In like manner, it will be understood that the outlet connection 8 is connected with a similar outlet chamber of the valve mechanism carried in the left portion of the casing as viewed in Fig. 1, and that this outlet connection is connected with another brake actuator, one of these actuators being customarily mounted to control the brakes on either side of the airplane or other vehicle.

As heretofore stated, an operator's control element or lever 5 is mounted on the casing for operating the control valve mechanism, and as indicated in Fig. 2, the lower portion 10 of the lever is pivotally mounted with respect to the casing by means of a ball 35 received in a ball socket 36 formed on the casing, the left end of the ball being provided with a stem 37 threadedly received by the portion 10 and maintained against rotation therein by means of a lock nut 38, it thus being apparent that the portion 10 may be adjustably positioned with respect to the ball and socket by turning the stem 37 in or out of the portion 10. The valve operating plunger 11 of the valve mechanism shown in section in Fig. 2 is in abutment with the portion 10 as shown in Fig. 1, and this plunger is connected with the valve operating element 22 by means of a guide 39 slidably mounted in the upper portion of the casing and connected with the valve operating element by means of a graduating spring 40 interposed between the guide member and the upper end of the element, the lower end of the plunger 11 being in engagement with a socket 41 formed in the guide, and being resiliently positioned for limited radial movement with respect to the guide by means of a flexible ring 42, which may be made of rubber or other similar material. The ball 35 is maintained in its socket by means of a threaded plug 43, and a slot 44 is provided on the right end of the ball to permit rotation of the latter to adjust the position of the ball with respect to the portion 10 of the operator controlled element.

A supply reservoir, not shown, is adapted to be connected to the inlet port 6, and this port is adapted to communicate with the inlet chamber 13 through a passage 45, a passage 46, an auxiliary inlet valve chamber 47, a passage 48, and a passage 49 connected with the passage 48, the passage 49 in turn being connected with an annular passage 50 connected with the inlet chamber 13 by means of ports 51, it being understood that the passage 49 is connected in the same manner with the inlet chamber of the left hand valve mechanism as viewed in Fig. 1, which is operated by the plunger 12. In order to normally isolate the supply port 6 from the inlet chambers of the control valve mechanism, an auxiliary inlet valve 51, shown in Fig. 2, is normally maintained in closed position against the upper end of the passage 46 by means of a trigger 52 pivotally mounted as shown by means of a pivot pin 53, and having a cam portion or projection 54 connected with the valve by means of a sliding plunger 55 and a relatively heavy spring 56 interposed between the plunger and the upper surface of the valve. Leakage from the chamber 47 to atmosphere by the plunger 55 is prevented by means of a suitable sealing member 56. The center line of the pivot pin 53 lies substantially in the vertical center line of the valve 51 and the plunger 55, and with the parts in the position shown, the end of the cam portion 54 lies slightly to the right of this center line, the parts being so proportioned that with the trigger in this position, the spring 56 is compressed sufficiently to maintain the valve 51 on its seat with sufficient force to prevent any leakage of fluid pressure from the passage 46 to the chamber 47. Counter clockwise rotation of the trigger from the position shown is prevented by means of a plunger 57 slidably mounted in a bore 58 formed in the casing of the valve mechanism, the lower end of the plunger abutting an arm 59 formed on the trigger and the upper end of the plunger being provided with a ball shaped portion 60 adapted to abut the upper end of a socket 61 formed in the portion 10 of the lever. Thus counter clockwise movement of the trigger can only occur on upward movement of the plunger, with consequent clockwise rotation of the portion 10 about the ball 35. In order that the control lever mechanism may be normally positioned in release position, a bracket 62 is provided on the casing, a flat surface 63 formed on the left side of this bracket being adapted to normally engage a similar flat surface 64 formed on the portion 10. Thus with the parts in the position shown, counter clockwise rotation of the trigger is prevented by the plunger and lever portion 10, while on rotation of the control lever in a counter clockwise direction about the ball 35, the plunger 57 is moved downward against the force exerted by a spring 65 interposed between the casing and formed on the plunger by a ball portion 60, and the trigger 52 is rotated in a clockwise direction until the end of the cam portion 54 moves to the left of the vertical center line of the plunger 55 and the pivot pin 53. As soon as this position is reached, the force exerted on the plunger by the spring 56 tends to continue the rotation of the trigger in a clockwise direction, and the cam portion 54 is moved to the left sufficiently to relieve the tension on the spring 56 in order to permit the valve 51 to be opened by the action of fluid pressure in the passage 46. Clockwise rotation of the trigger is limited by means of a stop 66 which abuts a portion 67 of the casing. Thus on initial movement of the control lever 5 and the lever portion 10 to effect operation of the self-lapping control valves, the trigger is moved sufficiently in clockwise direction to permit substantially immediate opening of the valve 51 in order to permit fluid pressure to be supplied from the inlet connection 6 to the inlet chamber 13 and to the inlet chamber of the other valve mechanism. Thereafter, the trigger remains in a position permitting opening of the valve 51 until such time that the trigger is reset by the operator to the position shown in Fig. 2, the trigger thus serving to indicate at all times to the operator whether or not the valve mechanism has been operated to apply the brakes without his knowledge. It is to be understood in this connection, that in many cases a reservoir filled with fluid at a high pressure is provided to supply a fluid pressure for the brake valve, and that no means are provided on the vehicle for replacing fluid pressure utilized from the reservoir. For this reason, it is desirable to completely isolate this reservoir from the brake valve mechanism in order to prevent even the slightest leakage from the reservoir to insure an adequate pressure therein when it is necessary to operate the control valve mechanism at some future time. To this end, the trigger is positioned as shown in Fig. 2 when the charged reservoir is connected to the vehicle, or whenever the reservoir is recharged by any other suitable means, and the trigger will remain in this position until the brake valve is operated, thus providing a visual indication to the operator that the brake valve mechanism has not been operated after charging of the reservoir.

From the foregoing description it will be apparent that as viewed in Fig. 2, the lever 5 is normally maintained in the position shown by means of the spring 65 acting on the plunger 57, and that the lever may be rotated in a counter clockwise direction in the plane of the drawing about the ball 35 in order to simultaneously depress plungers 11 and 12 in order to concurrently operate the right and left hand control valve mechanisms to supply equal pressures to the outlet ports 7 and 8. Likewise, with the lever in released position, and as viewed in Fig. 1, the lever may be rotated in a clockwise direction about the ball 35 in order to depress the plunger 11 to operate the right hand control mechanism, and in a counter clockwise direction to depress the plunger 12 in order to operate the left hand valve mechanism. In addition to the foregoing, it will be understood that with the lever rotated in a counter clockwise direction from the position shown in Fig. 2, the lever may be rotated away from the plane of the drawing in either direction in order to selectively vary the relative depression of the plungers 11 and 12 for the purpose of varying the pressures delivered by the control valves to the outlet ports 7 and 8. Thus the control lever 5 may be selectively operated to control the pressure delivered to the ports 7 and 8 in such a manner that these pressures are either equal or vary in any desired ratio. During rotation of the lever to the left or right as viewed in Fig. 1, the reaction from the plungers 11 and 12 is taken by the surfaces 63 and 64 in order to guide the movement of the lever in a true arc about the ball 35.

Referring now to Figs. 4, 5 and 6, a modified embodiment of the invention is shown as applied to dual control mechanism of the type shown in Fig. 1. Referring more particularly to Fig. 5, the control valve mechanism is provided with a casing 4 substantially the same as the casing shown in Fig. 1, the casing being provided with valve operating plungers 11 and 12. A lever 68 is provided at its right end with a ball 69 received in a socket 70 formed in the casing, the lever being provided with laterally extending arms 71 and 72 adapted respectively to engage the upper ends of plungers 11 and 12, recessed portions 73 and 74 on the lower surfaces of the arms being adapted to engage the upper ends of the plungers. The left end of the lever is provided with a cylindrical portion 75 adapted to slide in a slot 76 formed on the casing, upward movement of the lever in the slot being limited by means of a suitable pin 77. Thus the lever 68 is free to rotate in a counter clockwise direction from the position shown in Fig. 5 in order to depress both of the plungers 11 and 12 equally, and is also free to rotate about its longitudinal center line in order to selectively depress one or the other of the plungers. Operation of the lever 68 is controlled by means of an operator's control lever 78, this lever being pivotally mounted on the casing at its right end by means of a ball 79 in engagement with a socket 80. A roller 81 is pivotally mounted on the lower side of the lever by means of a pivot pin 82, the roller being in engagement with the upper surface of the laterally extending lever arms 71 and 72. Thus with the lever 78 in the position shown in Figs. 4 and 5, counter clockwise rotation of the lever about the ball 79 will serve to cause similar rotation of the lever 68 in order to equally depress both of the plungers 11 and 12. In addition to the foregoing, however, the lever 78 may also be rotated to the right or left as viewed in Fig. 4, and with the lever thus rotated, downward movement of the lever will serve to depress one of the plungers a greater amount than the other, depending on the degree of rotation to the right or left as shown in Fig. 4. In view of the arrangement of the roller 81 on the lever, it is undesirable that the lever be allowed to rotate about its longitudinal center line, and to this end, a slot 83 is provided on the surface of the ball 79 as partially shown in Fig. 5, this slot being engaged by a cylindrical portion 84 of a set screw 85 threadedly received in the casing. Thus rotation of the lever 78 about the longitudinal center line is prevented, and the roller 81 is at all times positioned directly beneath this center line.

It will be apparent from the foregoing that the lever 78 may be selectively operated to control the pressure delivered by one or both of the control valve mechanisms described more fully in connection with Figs. 1 and 2 in order to control the pressure delivered by the valve mechanisms. It will also be understood that the slot 83 may be so dimensioned with relationship to the position of the set screw 85 as to prevent upward movement of the lever 78 from the position shown, it being pointed out that the axial center line of the cylindrical portion 84 of the set screw passes through the center of ball 79. Although the auxiliary inlet valve mechanism illustrated and described in Figs. 1 and 2 has not been illustrated in the embodiment of the invention shown in Figs. 4 and 5, it will be apparent that this arrangement can be readily incorporated in the latter embodiment of the invention in a manner similar to that shown in Figs. 1 and 2.

While the invention has been illustrated and described herein with considerable particularity, it is to be understood that the same is not limited to the forms shown, but may receive a variety of mechanical expressions, as will now readily appear to those skilled in the art. Reference will, therefore, be had to the appended claims for a definition of the limits of the invention.

What is claimed is:

1. Fluid pressure control valve mechanism including a casing having an inlet chamber, an outlet chamber, an exhaust port, valve means for normally permitting communication between said outlet chamber and exhaust port and for preventing communication between said inlet and outlet chambers, means including a control lever having a release position and operable on movement from release position to operate said valve means to prevent communication between said outlet chamber and exhaust port and to permit communication between said inlet and outlet chambers, an auxiliary inlet chamber having a connection with said first named inlet chamber, an auxiliary inlet valve in said connection, means including a manually operable trigger normally positioned to maintain said auxiliary inlet valve in closed position, and means operable on initial movement of said control lever from release position for tripping said trigger to permit opening of the auxiliary inlet valve.

2. Fluid pressure control valve mechanism including a casing having an inlet chamber, an outlet chamber, an exhaust port, valve means for normally permitting communication between said outlet chamber and exhaust port and for preventing communication between said inlet and outlet chambers, means including a control lever having a release position and operable on movement from release position to operate said valve means to prevent communication between said outlet chamber and exhaust port and to permit communication between said inlet and outlet chambers, an auxiliary inlet chamber having a connection with said first named inlet chamber, an auxiliary inlet valve in said connection, means for normally holding said auxiliary inlet valve in closed position including a plunger slidably mounted in the casing, a spring interposed between said plunger and auxiliary inlet valve, and a manually operable trigger positioned to move said plunger to compress said spring for maintaining said auxiliary inlet valve in closed position, and means operable on initial movement of the control lever from release position for tripping said trigger and releasing said plunger, whereby the compression of said spring is relieved and the auxiliary inlet valve is permitted to open.

3. Fluid pressure control valve mechanism including a casing having an inlet chamber, an outlet chamber, an exhaust port, valve means for normally permitting communication between said outlet chamber and exhaust port and for preventing communication between said inlet and outlet chambers, means including a control lever having a release position and operable on movement from release position to operate said valve means to prevent communication between said outlet chamber and exhaust port and to permit communication between said inlet and outlet chambers, an auxiliary inlet chamber having a connection with said first named inlet chamber, an auxiliary inlet valve in said connection, and combined indicating and auxiliary valve controlling means for controlling the positioning of said valve and for indicating the positioning of said valve to the operator including a valve controlling element visible to the operator effective in one position to prevent opening of the auxiliary inlet valve and movable to another position to permit opening of said auxiliary valve, a connection between said element and control lever operable on initial movement of said lever to move the element to said another position, and means for maintaining said element in said another position.

4. Fluid pressure control valve mechanism including a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between the other outlet chamber and the corresponding exhaust port, an element responsive to the pressure in each outlet chamber for controlling the operation of the corresponding inlet and exhaust valves, an auxiliary inlet chamber having a passage connected with the first named inlet chamber, an auxiliary inlet valve for closing said passage, means including a trigger member for normally maintaining said auxiliary valve in closed position and operable to permit movement of said auxiliary valve to open position, a control lever mounted for universal movement on the casing operable on movement in one plane to selectively operate one or the other of said elements and operable on movement in planes at right angles thereto to operate said elements concurrently, a separate resilient connection between said lever and each of said elements, guide means on the casing for guiding the movement of the lever in said one plane and for preventing movement of the lever out of said one plane except in one direction, and means operable on movement of said lever away from said one plane in the opposite direction for operating said trigger member to permit opening of said auxiliary valve including a connection between said trigger member and lever.

5. Fluid pressure control valve mechanism including a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between the other outlet chamber and the corresponding exhaust port, an element responsive to the pressure in each outlet chamber for controlling the operation of the corresponding inlet and exhaust valves, an auxiliary control lever mounted for universal movement on the casing having separate laterally spaced resilient connections with said elements, guide means on the casing for preventing lateral movement of the auxiliary lever relative to the casing, and a main control lever mounted for universal movement on the casing having a portion in engagement with the auxiliary lever, said main lever being movable in one plane to operate the auxiliary lever to impose equal operating forces on said resilient connections and movable in other planes to operate the auxiliary lever to impose differential operating forces on said resilient connections.

6. Fluid pressure control valve mechanism including a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between the other outlet chamber and the corresponding exhaust port, an element responsive to the pressure in each outlet chamber for controlling the operation of the corresponding inlet and exhaust valves, an auxiliary control lever mounted for universal movement on the casing having laterally extending portions operatively connected with said elements by separate laterally spaced resilient connecting means, guide means on the casing for preventing lateral movement of the auxiliary lever, and means for operating said auxiliary lever including a main control lever mounted for universal movement on the casing having a portion adapted to engage the auxiliary lever and the laterally extending portions thereof, said main lever being adapted on movement in one plane to operate the auxiliary lever to impose substantially equal forces on each of said resilient connections and being adapted on movement in other planes to engage one or the other of the laterally extending portions of said auxiliary lever whereby the latter is operated to impose unequal forces on said resilient connections.

7. Fluid pressure control valve mechanism including a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between the other outlet chamber and the corresponding exhaust port, an element responsive to the pressure in each outlet chamber for controlling the operation of the corresponding inlet and exhaust valves, an auxiliary control lever mounted for universal movement on the casing having laterally extending portions operatively connected with said elements by separate laterally spaced resilient connecting means, guide means on the casing for preventing lateral movement of the auxiliary lever, means for operating said auxiliary lever including a main control lever mounted for universal movement on the casing having a portion adapted to engage the auxiliary lever and laterally extending portions thereof, said main lever being adapted on movement in one plane to operate the auxiliary lever to impose substantially equal forces on each of said resilient connections and being adapted on movement in other planes to engage one or the other of the laterally extending portions of said auxiliary lever whereby the latter is operated to impose unequal forces on said resilient connections, and means associated with the casing and main lever for preventing rotation of the latter about the axis thereof.

8. Fluid pressure control valve mechanism including a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between the other outlet chamber and the corresponding exhaust port, an element responsive to the pressure in each outlet chamber for controlling the operation of the corresponding inlet and exhaust valves, an auxiliary control lever mounted for universal movement on the casing having laterally extending portions operatively connected with said elements by separate laterally spaced resilient connecting means, guide means on the casing for preventing lateral movement of the auxiliary lever, and means for operating said auxiliary lever including a main control lever mounted for universal movement on the casing having a portion adapted to engage the auxiliary lever and laterally extending portions thereof, said main lever being adapted on movement in one plane to operate the auxiliary lever to impose substantially equal forces on each of said resilient connections and being so mounted as to have the longitudinal axis thereof substantially parallel with the longitudinal axis of the auxiliary lever during operation of the main lever in said one plane, and being adapted on movement in other planes to engage one or the other of the laterally extending portions of the auxiliary lever, whereby the latter is operated to impose unequal forces on said resilient connections.

9. The combination in a control valve of the type provided with a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between said other outlet chamber and the corresponding exhaust port, separate pressure responsive elements each responsive to the pressure in one of the outlet chambers for controlling the operation of the corresponding valves, and separate laterally spaced resilient connections for operating said elements, of means for selectively operating said resilient connections including a lever having a universal connection with the casing and a laterally extending bar adapted to engage said spaced resilient connections at points on either side of the longitudinal center line of said lever, guide means for preventing rotation of said lever about said universal connection except in one plane and for permitting rotation of the lever about the longitudinal axis thereof, and means for selectively operating said first named lever to impose equal or unequal forces on said resilient connections including a control lever having a universal connection with the casing spaced from the first named universal connection and means for engaging the bar of the first named lever, whereby rotation of the control lever in one plane about its universal connection serves to move the engaging means to a selected portion of the bar and rotation of the lever in another plane serves to move the bar and first named lever to vary the forces imposed on said resilient connections.

10. The combination in a control valve of the type provided with a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between said other outlet chamber and the corresponding exhaust port, separate pressure responsive elements each responsive to the pressure in one of the outlet chambers for controlling the operation of the corresponding valves, and separate laterally spaced resilient connections for operating said elements, of means for selectively operating said resilient connections including a lever having a universal connection with the casing and a laterally extending bar adapted to engage said spaced resilient connections at points on either side of the longitudinal center line of said lever, guide means for preventing rotation of said lever about said universal connection except in one plane and for permitting rotation of the lever about the longitudinal axis thereof, and means for selectively operating said first named lever to impose equal or unequal forces on said resilient connections including a control lever having a universal connection with the casing spaced from the first named universal connection and a pivotally mounted roller for engaging said bar, whereby on rotation of the control lever in one plane a selected portion of the bar is engaged by the roller and on rotation of the control lever in other planes the bar and first named lever are operated to transmit selected forces from the control lever to said resilient connections.

11. The combination in a control valve of the type provided with a casing having an inlet chamber, a pair of outlet chambers, an exhaust port for each outlet chamber, inlet and exhaust valves for controlling communication between one of said outlet chambers and the inlet chamber and between said one outlet chamber and the corresponding exhaust port, inlet and exhaust valves for controlling communication between the other outlet chamber and the inlet chamber and between said other outlet chamber and the corresponding exhaust port, separate pressure responsive elements each responsive to the pressure in one of the outlet chambers for controlling the operation of the corresponding valves, and separate laterally spaced resilient connections for operating said elements, of means for selectively operating said resilient connections including a lever having a universal connection with the casing and a laterally extending bar adapted to engage said spaced resilient connection at points on either side of the longitudinal center line of said lever, guide means for preventing rotation of said lever about said universal connection except in one plane and for permitting rotation of the lever about the longitudinal axis thereof, means for selectively operating said first named lever to impose equal or unequal forces on said resilient connections including a control lever having a universal connection with the casing spaced from the first named universal connection and a roller pivotally mounted on the control lever and adapted to engage the bar on the first named lever whereby rotation of the control lever in one plane serves to vary the point of engagement between the roller and bar and rotation of the control lever in other planes serves to move the bar and first named lever to operate said resilient connections, and means associated with the casing and said second named universal connection for preventing rotation of the control lever about its longitudinal axis.

STEPHEN VORECH.

REFERENCES CITED

The following references are of record in the file of this patent:

UNITED STATES PATENTS

| Number | Name | Date |
|---|---|---|
| 2,133,275 | Andres et al. | Oct. 18, 1938 |
| 2,259,184 | Stehlin | Oct. 14, 1941 |

FOREIGN PATENTS

| Number | Country | Date |
|---|---|---|
| 3,877 | Great Britain | Sept. 24, 1880 |
| 365,455 | Great Britain | Jan. 21, 1932 |